United States Patent
Buthler et al.

(10) Patent No.: US 12,057,943 B2
(45) Date of Patent: Aug. 6, 2024

(54) SOFT HARQ FOR SL RANGE BASED RETRANSMISSIONS

(71) Applicant: NOKIA TECHNOLOGIES OY, Espoo (FI)

(72) Inventors: Jakob Lindbjerg Buthler, Aalborg (DK); Jedrzej Stanczak, Wroclaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 329 days.

(21) Appl. No.: 17/754,474

(22) PCT Filed: Oct. 3, 2019

(86) PCT No.: PCT/EP2019/076791
§ 371 (c)(1),
(2) Date: Apr. 1, 2022

(87) PCT Pub. No.: WO2021/063508
PCT Pub. Date: Apr. 8, 2021

(65) Prior Publication Data
US 2023/0096912 A1    Mar. 30, 2023

(51) Int. Cl.
*H04L 1/18* (2023.01)
*H04L 1/1812* (2023.01)
*H04L 1/1825* (2023.01)

(52) U.S. Cl.
CPC .......... *H04L 1/1825* (2013.01); *H04L 1/1812* (2013.01)

(58) Field of Classification Search
CPC .................................................... H04L 1/1812
See application file for complete search history.

(56) References Cited

U.S. PATENT DOCUMENTS

2002/0054570 A1*  5/2002  Takeda .................... H04L 1/187
                                                                370/252
2011/0075679 A1*  3/2011  Yui ....................... H04L 1/1887
                                                                370/412

(Continued)

FOREIGN PATENT DOCUMENTS

WO       2012042454 A1    4/2012

OTHER PUBLICATIONS

International Search Report and Written Opinion for International Application No. PCT/EP2019/076791, mailed on Jun. 17, 2020, 15 pages.

(Continued)

*Primary Examiner* — Fahmida S Chowdhury
(74) *Attorney, Agent, or Firm* — Robert P. Michal, Esq.; Carter, DeLuca & Farrell LLP

(57) ABSTRACT

An apparatus is provided, in a first radio device, comprising at least one processor and at least one memory including computer program code, the at least one memory and the computer program code configured to, with the at least one processor, cause the apparatus at least to perform: transmitting data to at least one second radio device, wherein transmission of the data is controlled by an automatic retransmission procedure, receiving a response from the at least one second radio device, the response indicating the result of an attempt to decode the data and including range estimation information of the second radio device, and deciding on retransmitting the databased on the response and on the range estimation information of the second radio device.

12 Claims, 2 Drawing Sheets

(56) References Cited

U.S. PATENT DOCUMENTS

| | | | | |
|---|---|---|---|---|
| 2012/0163252 A1* | 6/2012 | Ahn | .................. | H04W 52/48 |
| | | | | 370/280 |
| 2018/0367261 A1* | 12/2018 | Gonzalves Serrano | .................. | |
| | | | | H04L 1/1812 |
| 2019/0239154 A1* | 8/2019 | Horn | .................. | H04W 48/18 |
| 2023/0096912 A1* | 3/2023 | Buthler | .............. | H04L 1/1825 |
| | | | | 370/328 |

OTHER PUBLICATIONS

3GPP TSG RAN WG1 #98; R1-1908733; "Discussion on Physical Layer Procedures for NR Sidelink", Agenda Item: 7.2.4.5; Source: Lenovo, Motorola Mobility; Prague, CZ; Aug. 26, 2019; 8 pages.

* cited by examiner

SOFT HARQ FOR SL RANGE BASED RETRANSMISSIONS

CROSS-REFERENCE TO RELATED APPLICATIONS

This application is a national stage entry of International Application No. PCT/EP2019/076791, filed Oct. 3, 2019, entitled "SOFT HARQ FOR SL RANGE BASED RETRANSMISSIONS" which is hereby incorporated by reference in its entirety.

FIELD OF THE INVENTION

The present invention relates to an apparatus, a method and a computer program product for enabling Soft HARQ for SL range based retransmissions.

RELATED BACKGROUND ART

The following meanings for the abbreviations used in this specification apply:
5QI: 5G QoS Indicator
ACK: Acknowledgement
HARQ: Hybrid Automatic Repeat Request
NACK: Negative Acknowledgment
PC5: equivalent of Sidelink interface
PQI PC5 QoS Indicator
QoS: Quality of Service
RRC: Radio Resource Control
SL: Sidelink
UE: User Equipment
V2X: Vehicle-to Everything Example embodiments, although not limited to this, relate to V2X communications, and in more general to communications which may be carried out directly between UEs.

In particular in situations with fast moving UEs (such as in case of vehicles), the distance, i.e., the range between the UEs plays a factor. It is however difficult to correctly determine a relative range between a transmitting UE and a receiving UE with high precision.

This may lead to situations in which in a HARQ procedure acknowledgements (ACK) or negative acknowledgments (NACK) are not correctly sent.

SUMMARY OF THE INVENTION

Example embodiments of the present invention address this situation and aim to provide a mechanism which allows a transmitting user equipment to decide whether data in an HARQ should be retransmitted or not.

According to a first aspect, an apparatus is provided which comprises at least one processor and at least one memory including computer program code, the at least one memory and the computer program code configured to, with the at least one processor, cause the apparatus at least to perform: transmitting data to at least one second radio device, wherein transmission of the data is controlled by an automatic retransmission procedure, receiving a response from the at least one second radio device, the response indicating the result of an attempt to decode the data and including range estimation information of the second radio device, and deciding on retransmitting the data based on the response and on the range estimation information of the second radio device.

According to a second aspect, a method is provided, in a first radio device, the method comprising:
transmitting data to at least one second radio device, wherein transmission of the data is controlled by an automatic retransmission procedure,
receiving a response from the at least one second radio device, the response indicating the result of an attempt to decode the data and including range estimation information of the second radio device, and
deciding on retransmitting the data based on the response and on the range estimation information of the second radio device.

The first and second aspects may be modified as follows:
The response may be an acknowledgement in case of a successful attempt to decode the data, and the response may be a non-acknowledgement in case of a non-successful attempt to decode the received data, and, upon deciding on retransmitting the data, the data may be retransmitted, based on the decision on retransmitting the data, in case a non-acknowledgement is received, or retransmitting the data may be stopped in case an acknowledgement is received or in case neither an acknowledgement nor a non-acknowledgement is received.

The range estimation information may comprise a range estimation indicating an estimated range between the first radio device and the second radio device and/or an estimated precision of the range estimation.

Moreover, it may be decided to retransmit the data in case the estimated precision of the range estimation is higher than a certain precision threshold, and it may be decided to not retransmit the data in case the estimated precision of the range estimation is lower than the precision threshold.

A packet error experienced by the second radio device may be based on the received non-acknowledgment from the second radio device.

Furthermore, the packet error may be determined by weighting a plurality of received non-acknowledgments from the second radio device, and it may be decided on retransmitting the data also based the determined packet error considering the plurality of the received non-acknowledgments.

According to a third aspect, an apparatus is provided, in a second radio device, the apparatus comprising at least one processor and at least one memory including computer program code, the at least one memory and the computer program code configured to, with the at least one processor, cause the apparatus at least to perform: receiving data from a first radio device, wherein transmission of the data is controlled by an automatic retransmission procedure, attempting to decode the received data, providing range estimation information concerning a range between the first radio device and the second radio device, and transmitting a response to the first radio device indicating the result of the attempt to decode the received data based on the estimated range between the first radio device and the second radio device, the response including the range estimation information.

According to a fourth aspect a method is provided, in a second radio device, the method comprising:
receiving data from a first radio device, wherein transmission of the data is controlled by an automatic retransmission procedure,
attempting to decode the received data,
providing range estimation information concerning a range between the first radio device and the second radio device, and
transmitting a response to the first radio device indicating the result of the attempt to decode the received data based on the estimated range between the first radio device and the second radio device, the response including the range estimation information.

The third and fourth aspects may be modified as follows:

The response may be an acknowledgment in case the attempt to decode the received data is successful, and in case the attempt to decode the received data is not successful, the response may be a non-acknowledgement, wherein an acknowledgement or a non-acknowledgment may be transmitted when the estimated range is equal to or below a range threshold, and neither an acknowledgement nor an acknowledgment may be transmitted when the estimated range exceeds the range threshold.

Moreover, the precision of the range estimation may be estimated, and the estimated precision of the range estimation may be included into the range estimation information.

The range estimation information may comprise a range estimation indicating an estimated range between the first radio device and the second radio device.

Moreover, the range estimation may be compared to range requirements specified for the data.

According to a fifth aspect of the present invention a computer program product is provided which comprises code means for performing a method according to any one of the second and fourth aspects and/or their modifications when run on a processing means or module. The computer program product may be embodied on a computer-readable medium, and/or the computer program product may be directly loadable into the internal memory of the computer and/or transmittable via a network by means of at least one of upload, download and push procedures.

According to a sixth aspect an apparatus is provided, which comprises means for transmitting data to at least one second radio device controlled by an automatic retransmission procedure, means for receiving a response from the at least one second radio device, the response indicating the result of an attempt to decode the data and including range estimation information of the second radio device, and means for deciding on retransmitting the data based on the response and on the range estimation information of the second radio device.

According to a seventh aspect an apparatus is provided, which comprises means for receiving data from a first radio device controlled by an automatic retransmission procedure, means for attempting to decode the received data, means for providing range estimation information concerning a range between the first radio device and the second radio device, and means for transmitting a response to the first radio device indicating the result of the attempt to decode the received data based on the estimated range between the first radio device and the second radio device, the response including the range estimation information.

The sixth to seventh aspects may be modified similar as the first and third aspects.

BRIEF DESCRIPTION OF THE DRAWINGS

These and other objects, features, details and advantages will become more fully apparent from the following detailed description of example embodiments of the present invention which is to be taken in conjunction with the appended drawings, in which.

DETAILED DESCRIPTION OF EXAMPLE EMBODIMENTS

In the following, description will be made to example embodiments of the present invention. It is to be understood, however, that the description is given by way of example only, and that the described example embodiments are by no means to be understood as limiting the present invention thereto.

Before describing example embodiments in detail, the problem underlying the present application is described in some more detail.

As mentioned above, some example embodiments relate to V2X, i.e., vehicle to everything transmission. A direct transmission from one UE to another UE is also referred to as sidelink (SL). Currently, the WI for Re116 V2X sidelink (SL) discussion includes QoS application and measurements application.

In respect to SL groupcast, and potentially broadcast, it is currently discussed whether/how there will be any form of HARQ procedures, with the agreement that it at least HARQ NACK will be supported in SL groupcast.

Another topic is whether/how to define and measure the QoS over SL groupcast or broadcast. When analysing QoS one of the measures may be the packet loss, for which statistics may be collected based on i.e. the HARQ feedback of the devices.

One of the issues is how to define which devices should respond with e.g. a HARQ NACK, and a proposal is to provide a range parameter between devices as to decide whether to e.g. respond with a NACK to a current data reception. If the device is within the range provide through e.g. the QoS parameter, but the receiving UE cannot decode, then a NACK should be sent. However, if the UE is not able to decode, but is outside the maximum communication range, then the NACK should not be sent. It is also still under discussion whether the maximum range is static by configuration, or dynamic by signaling. Several concepts have been suggested on how to calculate this range, each with different precision.

Relative range between the transmitting and receiving entity may be difficult to determine to a high precision, based on the methods used. If the range is calculated i.e. based on zones, the range parameter precision varies based on zone design, but in general will deviate more than i.e. a GPS based solution. However, using the GPS signal to determine a NACK, requires the device to have prior knowledge of the transmitters position and extrapolate the current position based on that, as the current data packet, and its location content, could not be decoded. This means that in SL group and broadcast scenarios, it is not trivial for the receiving, or transmitting UE to determine whether data packets are eligible for retransmission given the range. This may either lead to increased load on the network, as the receiving UE may send a NACK without being in the range, or a wrong QoS measurement due to a too high packet error rate.

Example embodiments aim to solve this problem.

In the following, a general overview of some example embodiments is described by referring to FIGS. 1 to 4.

Figure 1:
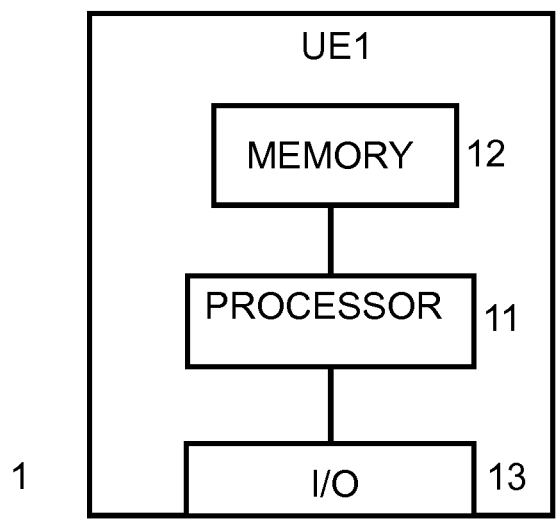
FIG. 1 shows a transmitting UE1 according to an example embodiment.
Figure 4:
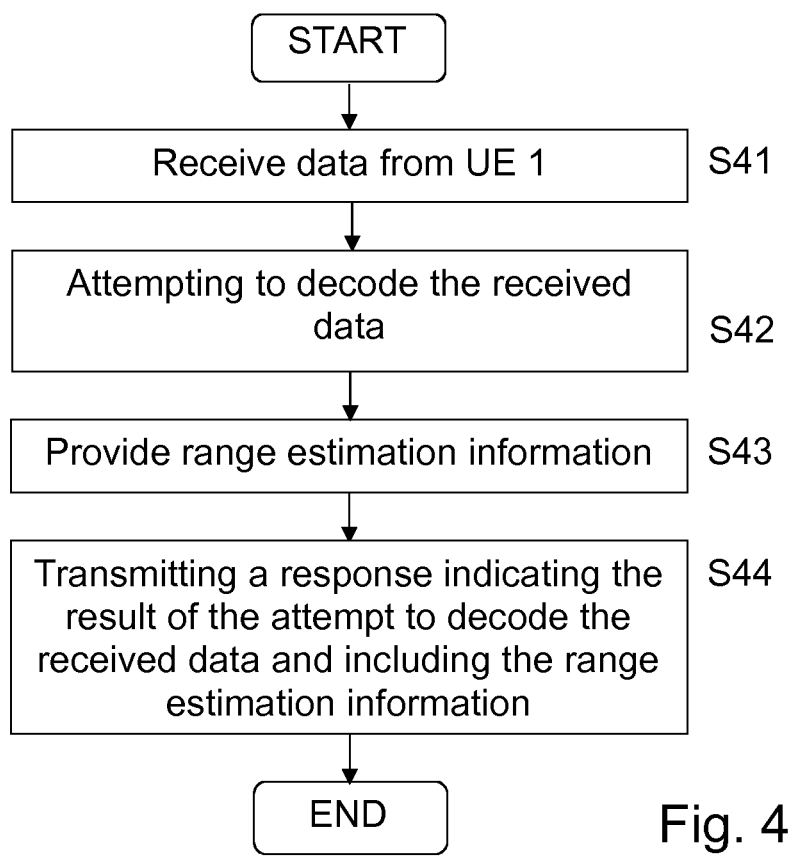
FIG. 4 shows a procedure carried out by the UE2 according to an example embodiment.

FIG. 1 shows a first user equipment (UE) 1 as an example for a first apparatus according to the present example embodiment. The apparatus may be a first radio device such as the UE1, or may be a part thereof. A procedure carried out by the UE2 is illustrated in FIG. 4.

The UE1 comprises at least one processor 11 and at least one memory 12 including computer program code. The at least one processor 11, with the at least one memory 12 and the computer program code, is configured to cause the apparatus to perform: transmitting data to at least one second radio device (e.g., UE2 shown in FIG. 2), wherein transmission of the data is controlled by (according to) an automatic retransmission procedure (as shown in S31 of FIG. 3), receiving a response from the at least one second radio device, the response indicating the result of an attempt to decode the data and including range estimation information of the second radio device (as shown in S32 of FIG. 3), and deciding on retransmitting the data based on the response and on the range estimation information of the second radio device (as shown in S33 of FIG. 3).

Figure 2:
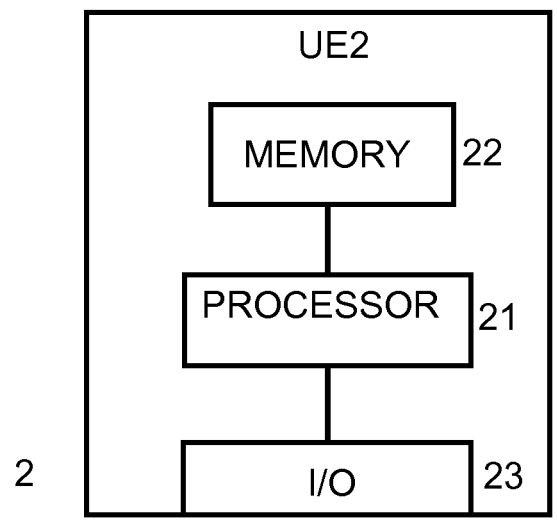
FIG. 2 shows a receiving UE2 according to an example embodiment.
Figure 3:
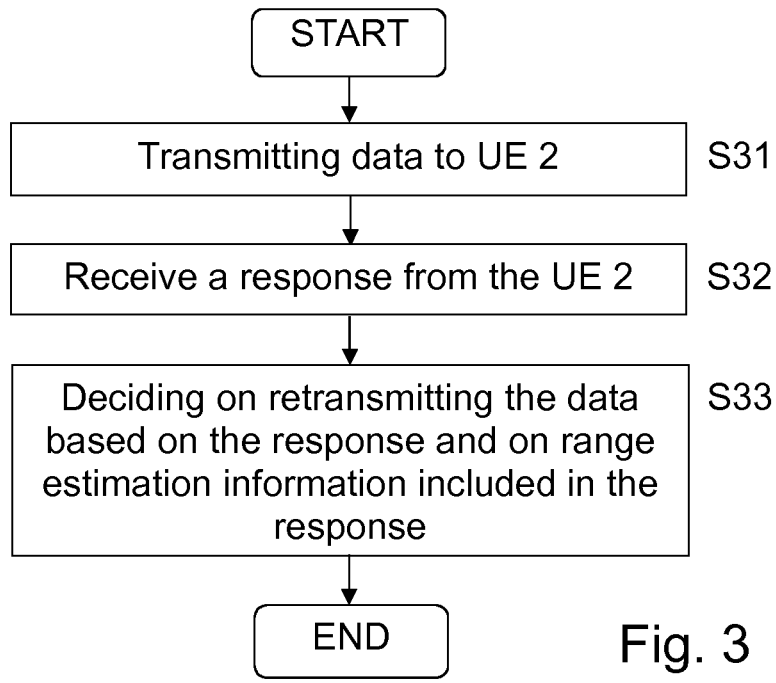
FIG. 3 shows a procedure carried out by the UE1 according to an example embodiment.

FIG. 2 shows a second user equipment (UE) 2 as an example for a second apparatus according to the present example embodiment. The apparatus may be second radio device such as the UE, or may be a part thereof. A procedure carried out by the UE2 is illustrated in FIG. 4.

The UE2 comprises at least one processor 21 and at least one memory 22 including computer program code. The at least one processor 21, with the at least one memory 22 and the computer program code, is configured to cause the apparatus to perform: receiving data from a first radio device (e.g., UE1 shown in FIG. 1), wherein transmission of the data is controlled by (according to) an automatic retransmission procedure (as shown in S41 of FIG. 4), attempting to decode the received data (as shown in S42 of FIG. 4), providing range estimation information concerning a range between the first radio device and the second radio device (as shown in S43 of FIG. 4), and transmitting a response to the first radio device indicating the result of the attempt to decode the received data based on the estimated range between the first radio device and the second radio device, the response including the range estimation information (as shown in S44 of FIG. 4).

The UE1 may further comprise an I/O unit 13, which is capable of transmitting to and receiving from other radio devices such as the UE1, and, likewise, the UE2 may further comprise an I/O unit 23, which is cable of transmitting to and receiving from other radio devices such as the UE1, for example.

Thus, according to example embodiments, a second radio device (a receiving UE, e.g., UE2 shown in FIG. 2) checks, upon receiving a message from a first radio device (a transmitting UE, e.g., UE1 shown in FIG. 1), which it is unable to decode, the precision (reliability) of a range estimation (e.g. a range parameter described later) and the range itself (i.e., whether the UE2 is close to a maximum range or far way therefrom), and indicates a result of this check in a response (e.g., a soft NACK) to the transmitting UE (UE1), which then decides whether and how to transmit or retransmit based on this result.

In the automatic retransmission procedure described above the response may be an acknowledgement (e.g., ACK) in case of a successful attempt to decode the data, and the response may be a non-acknowledgement (NACK) in case of a non-successful attempt to decode the received data. In this way, the response can indicate the result of the attempt to decode the data. Moreover, upon deciding on retransmitting the data, the UE1 may retransmit the data, based on the decision on retransmitting the data, in case a non-acknowledgement (NACK) is received, or stop retransmitting the data in case an acknowledgement (ACK) is received or in case neither an acknowledgement (ACK) nor a non-acknowledgement (NACK) is received.

For the decision as to whether the data (the data to be transmitted from the first radio device (transmitting UE1) to the second radio device (receiving UE2) controlled by the automatic retransmission procedure) should be retransmitted or not, an estimated precision of a range estimation included in the range estimation information may be used.

The automatic retransmission procedure described above, by which the transmission of the data from the first radio device to the second radio device is controlled, may be a HARQ procedure, for example.

In the following, some example embodiments are described in more detail.

According to some example embodiments, a soft-HARQ response for at least SL group and broadcast is provided which will help control the number of retransmissions. This may also enable a more reliable measure of QoS. The soft-HARQ will indicate the receiving UEs perceived eligibility to request a retransmission, based on i.e. the range.

The eligibility to request a retransmission of the receiving UE is in the following also referred to as NACK eligibility. A low eligibility NACK indicates that the UE perceives or considers that the eligibility to request a retransmission is low (for example due to a low precision of the range parameter, as described in the following), whereas low a high eligibility NACK indicates that the UE perceives or considers that the eligibility to request a retransmission is high (for example due to a high precision of the range parameter or since the distance or the range to the transmitting UE is short). The eligibility can be represented in different levels, which may be indicated by eligibility figures. For example, in case there only two levels, these can be indicated as a high or low eligibility NACK, as will be described in the following. When there are three levels, these could be indicated as high, middle or low eligibility NACK. Otherwise, they could also be indicated by eligibility figures (numbers). Thus, the eligibility indicates a confidence of the receiving UE concerning its range.

The soft HARQ can be L1 based, using i.e. extended orthogonal HARQ sequence feedbacks, mapped to different NACK eligibility.

Alternatively, the soft HARQ can be MAC based, by extending the HARQ procedure through RRC, using the HARQ ID as a reference. The below description assumes a HARQ NACK response only, but the concept could also be applied to HARQ ACK.

According to some example embodiments, when a transmitting UE transmits data, which should be received by peer UEs within a certain range, the receiving UE will reply with a soft-NACK, reflecting the devices perceived reliability of the range estimate that triggered the NACK. The soft-HARQ response may then be used by the network, or device, to decide whether to i.e. retransmit the data packet, or even calculate a weighted mean of the experienced packet error, as exemplified in the following.

In the following, some use cases with the soft-NACK are described.

In general, the triggering procedure would be:

At first, a transmitting UE (which is referred to as UE1 in the following) sends a group (or broadcast) message.

A receiving UE (which is referred to as UE2 in the following) UE2 receives the data packet but is unable to decode.

Then, the UE2 checks the range requirement for the data packet, i.e. through the QoS, PFI, QFI, or other measures, for the given bearer, and compares to the internal range estimation between the transmitting UE1 and the receiving UE2.

Hereafter, the following novel procedures could be followed:

First, a first example with a low eligibility NACK is described.

In this first example, it is assumed that the UE2 estimates that the range parameter is of low precision and/or that it is close to the maximum range. In this case, the UE2 sends a soft-NACK with a value indicating that the NACK might be wrong (low eligibility NACK).

The UE1 receives this soft-NACK. Based therein, the UE1 either:

retransmits the data packet if i.e. the QoS requirement is high, or network load is low, as to accommodate the NACK, or does not retransmit the data packet if i.e. the QoS is low, as to reduce network load and power consumption Next, a second example with a high eligibility NACK is described.

In this second example, it is assumed that UE2 estimates that the range parameter is of low precision and indicates that the maximum range is well exceeded (i.e., that the range between UE1 and UE2 is larger than the maximum range). In this case, the UE2 sends a soft-NACK with a value indicating that the NACK is of high precision.

The UE1 does not retransmit the data packet due to received NACK.

Next, a third example with a high eligibility NACK is described.

In this third example, it is assumed that the UE2 estimates that the range parameter is of low precision but that it does not exceed the maximum range. In this case, the UE2 sends a soft-NACK with a value indicating that the NACK is most likely correct.

The UE1 retransmits the data packet due to received NACK status, as the uncertainty does not justify a high enough probability for the UE2 to be out of range.

Next a fourth example with a high eligibility NACK is described.

In this fourth example, it is assumed that the UE2 estimates that the range parameter is of high precision but that it is close to the maximum range. In this case, the UE2 sends a soft-NACK with a value indicating that the NACK is most likely correct.

The UE1 retransmits the data packet due to received NACK status

Additionally in all cases, the UE1 may use the eligibility figure (e.g., whether it is a high eligibility NACK or a low eligibility NACK) to estimate the packet error rate. If the eligibility is low, the weighting of the NACK should be lower than if it were high, when calculating e.g. QoS parameters such as packet error ratio.

Thus, according to example embodiments, an increased reliability is achieved, as the transmitting UE may now have an indication of the range at which the receiving UE is at.

Moreover, a decreased network load is achieved as the transmitting UE does not need to retransmit packets with low QoS and a low eligibility of the NACK.

Furthermore, an increased precision of QoS parameter calculations such as packet error ratio is achieved, as the transmitting UE may now know whether/how the NACK should be incorporated in the calculation.

For example, the range parameter as described above can be determined in different ways. For example, the UE may have an indication of the vehicles around it. For example, all vehicles in proximity will have broadcasted the position, speed, direction, and other factors, at a point in time, wherein the receiving vehicle then is able to map them all approximately. It is noted that, as it is assumed the message to be NACK'ed is not able to be decoded, the range estimate may come from this exact message based on i.e. RSRP measurements, or other low layer signal measurements (potentially, it may also be by using the synchronisation bursts). Otherwise, the range estimation may come from prior decodable messages from the transmitting vehicle, such that the receiving vehicle has been able to track it.

The range requirement described above may assume comes from at least the given QoS requirement which is determined for the given logical channel. This may be indicated in i.e. the 5QI, PQI, or whatever QoS profile is chosen to be denoted as the applied one.

The above-described example embodiments are only examples and may be modified.

In some of the example embodiments, the UEs are provided in vehicles. However, the embodiments are not limited to vehicles, and the UE may be any kind of terminal devices.

Furthermore, in some of the example embodiments, a direct transmission between UEs is described. However, the embodiments are not limited to this, and the transmitting UE may be any kind of base station (gNB, eNB), for example.

Moreover, according to some example embodiments, an estimation of the range is included in the NACK. However, the estimation of the range may also be included into the ACK. In this way, the estimation of the range may be used for sending different data in another message to the corresponding UE.

The decision for providing different NACK eligibilities (eligibility figures or levels) may also be based on other factors like the QoS, speed, and other factors. For example, the low eligibility NACK could also be an indication of a way forward for the transmitter.

There are several potential ways of implementing a decision at the transmitting UE (Tx UE) using various criteria:

If one, or more, high eligibility NACKs are received by the transmitting UE, the transmitting UE may retransmit.

Else if one, or more medium eligibility NACKs are received, and the QoS states a high reliability, the transmitting UE may retransmit.

Else if one, or more, low eligibility NACKs are received, and the network load is lower than a certain threshold, and QoS states a low reliability, then, if the transmitting UE perceives the message content to change within a timeframe at which the vehicle sent the low eligibility NACK vehicle will most likely not need the information right now, the transmitting UE may omit a retransmission. Else, the transmitting UE may retransmit.

Several potential implementation specific criteria for the transmitting UE may be defined, whereas some may be informed to the receiving UE(s) beforehand, as for them to be able to calculate the eligibility.

Names of network elements, protocols, and methods are based on current standards. In other versions or other technologies, the names of these network elements and/or protocols and/or methods may be different, as long as they provide a corresponding functionality.

In general, the example embodiments may be implemented by computer software stored in the memory (memory resources, memory circuitry) 12, 22 and executable by the processor (processing resources, processing circuitry) 11, 21 or by hardware, or by a combination of software and/or firmware and hardware.

As used in this application, the term "circuitry" refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The memory (memory resources, memory circuitry) 12, 22 may be of any type suitable to the local technical environment and may be implemented using any suitable data storage technology, such as semiconductor based memory devices, magnetic memory devices and systems, optical memory devices and systems, fixed memory and removable memory, and non-transitory computer-readable media. The processor (processing resources, processing circuitry) 11, 21 may be of any type suitable to the local technical environment, and may include one or more of general purpose computers, special purpose computers, microprocessors, digital signal processors (DSPs) and processors based on a multi core processor architecture, as non-limiting examples.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. An apparatus, in a first radio device, comprising:
    at least one processor and at least one memory including computer program code, the at least one memory and the computer program code configured to, with the at least one processor, cause the apparatus at least to:
    transmit data to at least one second radio device, wherein transmission of the data is controlled by an automatic retransmission procedure,
    receive a response from the at least one second radio device, the response indicating the result of an attempt to decode the data and including range estimation information of the second radio device, and
    decide on retransmitting the data based on the response and on the range estimation information of the second radio device,
    wherein the range estimation information comprises a range estimation indicating an estimated range between the first radio device and the second radio device and/or an estimated precision of the range estimation, and
    wherein the at least one memory and the computer program code are configured to, with the at least one processor, cause the apparatus to further:
    decide to retransmit the data in case the estimated precision of the range estimation is higher than a certain precision threshold, and
    decide to not retransmit the data in case the estimated precision of the range estimation is lower than the precision threshold.

2. The apparatus according to claim 1, wherein the response is an acknowledgement in case of a successful attempt to decode the data, and the response is a non-acknowledgement in case of a non-successful attempt to decode the received data, and
    the at least one memory and the computer program code are configured to, with the at least one processor, cause the apparatus, upon deciding on retransmitting the data, to further:
    transmit the data, based on the decision on retransmitting the data, in case a non-acknowledgement is received, or
    stop retransmitting the data in case an acknowledgement is received or in case neither an acknowledgement nor a non-acknowledgement is received.

3. The apparatus according to claim 2, wherein the at least one memory and the computer program code are configured to, with the at least one processor, cause the apparatus to further:
    determine a packet error experienced by the second radio device based on the received non-acknowledgment from the second radio device.

4. The apparatus according to claim 3, wherein the at least one memory and the computer program code are configured to, with the at least one processor, cause the apparatus to further:
    determine the packet error by weighting a plurality of received non-acknowledgments from the second radio device, and
    decide on retransmitting the data also based the determined packet error considering the plurality of the received non-acknowledgments.

5. An apparatus, in a second radio device, comprising:
    at least one processor and at least one memory including computer program code, the at least one memory and the computer program code configured to, with the at least one processor, cause the apparatus at least to:
    receive data from a first radio device, wherein transmission of the data is controlled by an automatic retransmission procedure,
    attempt to decode the received data,
    provide range estimation information concerning a range between the first radio device and the second radio device, and
    transmit a response to the first radio device indicating the result of the attempt to decode the received data based on the estimated range between the first radio device and the second radio device, the response including the range estimation information wherein, in case the attempt to decode the received data is successful, the response is an acknowledgment, and in case the attempt to decode the received data is not successful, the response is a non-acknowledgement, and the at least one memory and the computer program code are configured to, with the at least one processor, cause the apparatus to further:

transmit an acknowledgement or a non-acknowledgment when the estimated range is equal to or below a range threshold, and transmit neither an acknowledgement nor an acknowledgment when the estimated range exceeds the range threshold.

6. The apparatus according to claim 5, wherein the at least one memory and the computer program code are configured to, with the at least one processor, cause the apparatus to further:

estimate the precision of the range estimation, and include the estimated precision of the range estimation into the range estimation information.

7. The apparatus according to claim 5, wherein the range estimation information comprises a range estimation indicating an estimated range between the first radio device and the second radio device.

8. The apparatus according to claim 7, wherein the at least one memory and the computer program code are configured to, with the at least one processor, cause the apparatus to further:

compare the range estimation to range requirements specified for the data.

9. A method, in a first radio device, comprising:

transmitting data to at least one second radio device, wherein transmission of the data is controlled by an automatic retransmission procedure, receiving a response from the at least one second radio device, the response indicating the result of an attempt to decode the data and including range estimation information of the second radio device, deciding on retransmitting the data based on the response and on the range estimation information of the second radio device, deciding to retransmit the data in case the estimated precision of the range estimation is higher than a certain precision threshold, and deciding to not retransmit the data in case the estimated precision of the range estimation is lower than the precision threshold, wherein the range estimation information comprises a range estimation indicating an estimated range between the first radio device and the second radio device and/or an estimated precision of the range estimation.

10. The method according to claim 9, wherein the response is an acknowledgement in case of a successful attempt to decode the data, and the response is a non-acknowledgement in case of a non-successful attempt to decode the received data, and the method further comprises:

retransmitting the data, based on the decision on retransmitting the data, in case a non-acknowledgement is received, or stopping retransmitting the data in case an acknowledgement is received or in case neither an acknowledgement nor a non-acknowledgement is received.

11. The method according to claim 10, further comprising:

determining a packet error experienced by the second radio device based on the received non-acknowledgment from the second radio device.

12. The method according to claim 11, further comprising:

determining the packet error by weighting a plurality of received non-acknowledgments from the second radio device, and deciding on retransmitting the data also based the determined packet error considering the plurality of the received non-acknowledgments.

* * * * *